(12) United States Patent
Wood

(10) Patent No.: US 9,955,225 B1
(45) Date of Patent: Apr. 24, 2018

(54) SHARING VIDEO CONTENT FROM A SET TOP BOX THROUGH A MOBILE PHONE

(71) Applicant: AT&T MOBILITY II LLC, Atlanta, GA (US)

(72) Inventor: Christopher McNair Wood, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/475,862

(22) Filed: Mar. 31, 2017

(51) Int. Cl.
*H04N 21/4788* (2011.01)
*H04L 29/06* (2006.01)
*H04L 29/08* (2006.01)
*H04L 12/58* (2006.01)
*H04N 21/2183* (2011.01)
*H04N 21/4627* (2011.01)

(52) U.S. Cl.
CPC ......... *H04N 21/4788* (2013.01); *H04L 51/10* (2013.01); *H04L 65/602* (2013.01); *H04L 67/2842* (2013.01); *H04L 67/2857* (2013.01); *H04N 21/2183* (2013.01); *H04N 21/4627* (2013.01); *H04L 51/04* (2013.01); *H04L 51/08* (2013.01)

(58) Field of Classification Search
None
See application file for complete search history.

(56) References Cited

U.S. PATENT DOCUMENTS 7,886,327 B2 * 2/2011 Stevens ............. G06F 17/30017
725/103
8,219,123 B2 7/2012 Deutsch et al.
8,258,028 B2 9/2012 Tilke et al.
8,566,886 B2 10/2013 Scholl et al.
8,768,744 B2 7/2014 Narasimhan et al.
(Continued)

FOREIGN PATENT DOCUMENTS

CN 104349216 A 2/2015
WO 2014036362 A1 3/2014
(Continued)

OTHER PUBLICATIONS

Ho, Yeh-Chin et al., "Implementing Value Added Applications in Next Generation Networks".
(Continued)

*Primary Examiner* — Omar S Parra
(74) *Attorney, Agent, or Firm* — Guntin & Gust, PLC; Jay H. Anderson

(57) ABSTRACT

Aspects of the subject disclosure may include, for example, a device that facilitates sharing, by a mobile phone user, content that the user has viewed on a television coupled to a media processor. A message is initiated via a messaging client of the mobile phone, and a video clip is obtained by the mobile phone from the media processor. Additional video content provided at the mobile phone is attached to the video clip. The format of the video clip is converted to enable presentation of the converted video clip at a recipient device; the converted video clip is transmitted to the recipient device via the messaging client. The media processor and the mobile phone form a natively integrated device, so that a video clip of the content can be produced and transmitted without installation of an application on the mobile phone.

20 Claims, 8 Drawing Sheets

(56) References Cited

U.S. PATENT DOCUMENTS

| | | | |
|---|---|---|---|
| 8,789,093 | B2 | 7/2014 | Medina et al. |
| 8,826,321 | B2 | 9/2014 | Cronin et al. |
| 8,904,414 | B2 | 12/2014 | Khan et al. |
| 8,959,539 | B2 | 2/2015 | Ruiz-Velasco et al. |
| 9,015,751 | B2 * | 4/2015 | Jeong .................... G06F 3/0346 725/37 |
| 9,066,133 | B2 | 6/2015 | Sharif-Ahmadi et al. |
| 9,118,956 | B2 | 8/2015 | Stahulak et al. |
| 9,232,248 | B2 | 1/2016 | Issa et al. |
| 9,356,984 | B2 | 5/2016 | Krikorian et al. |
| 9,440,152 | B2 | 9/2016 | Thompson et al. |
| 2007/0168543 | A1 * | 7/2007 | Krikorian ............ G11B 27/034 709/231 |
| 2008/0022297 | A1 | 1/2008 | Walter et al. |
| 2011/0321107 | A1 | 12/2011 | Banks et al. |
| 2012/0066722 | A1 | 3/2012 | Cheung et al. |
| 2013/0054408 | A1 | 2/2013 | Piepenbrink et al. |
| 2014/0108932 | A1 | 4/2014 | Soderstrom et al. |
| 2015/0020120 | A1 | 1/2015 | Cannon |
| 2015/0373065 | A1 | 12/2015 | Holmquist et al. |
| 2016/0078903 | A1 | 3/2016 | Chitnis et al. |
| 2016/0134922 | A1 | 5/2016 | Bogers |
| 2016/0205431 | A1 | 7/2016 | Avedissian et al. |
| 2016/0269645 | A1 | 9/2016 | Khoe et al. |
| 2016/0381416 | A1 | 12/2016 | Fan et al. |
| 2017/0034583 | A1 * | 2/2017 | Long ..................... G11B 27/031 |
| 2017/0169039 | A1 * | 6/2017 | Brown ................. G06F 17/3082 |

FOREIGN PATENT DOCUMENTS

| | | | |
|---|---|---|---|
| WO | 2014110192 | A1 | 7/2014 |
| WO | 2016112063 | A1 | 7/2016 |

OTHER PUBLICATIONS www.mdpi.com/journal/futureinternet, Future Internet ISSN 1999-5903, 2010, 282-294.

Jin, Chun et al., "The Design of Digital Television Multimedia Message Service System", Computer and Information Science vol. 2, No. 2, May 2009, 141-144.

Rauschenbach, Uwe et al., ""Next-Generation Interactive Broadcast Services"", Proceedings of WSDB 2004—5th Workshop Digital Broadcasting, Sep. 2004., Aug. 1, 2015, 1-7.

Tschulik, Peter, "Chances and Challenges of Interactive TV Offerings Over DSL", Journal of the Communications Network 4, 2005, 49-53.

* cited by examiner

100

200

300

500

SHARING VIDEO CONTENT FROM A SET TOP BOX THROUGH A MOBILE PHONE

FIELD OF THE DISCLOSURE

The subject disclosure relates to a method and apparatus for sharing video content from a set top box through a mobile phone.

BACKGROUND

Viewers of video content (including broadcast television, Pay TV, video-on-demand or VOD, etc.) often wish to share what they see with others. A smartphone's video recording feature can be used to capture content as it is presented on a television screen, but with significant end user effort and a reduction in audio and video quality. A smartphone's sharing features typically are used for content being displayed at the smartphone, rather than at a separate device such as a television.

BRIEF DESCRIPTION OF THE DRAWINGS

Reference will now be made to the accompanying drawings, which are not necessarily drawn to scale, and wherein.

DETAILED DESCRIPTION

Figure 1:
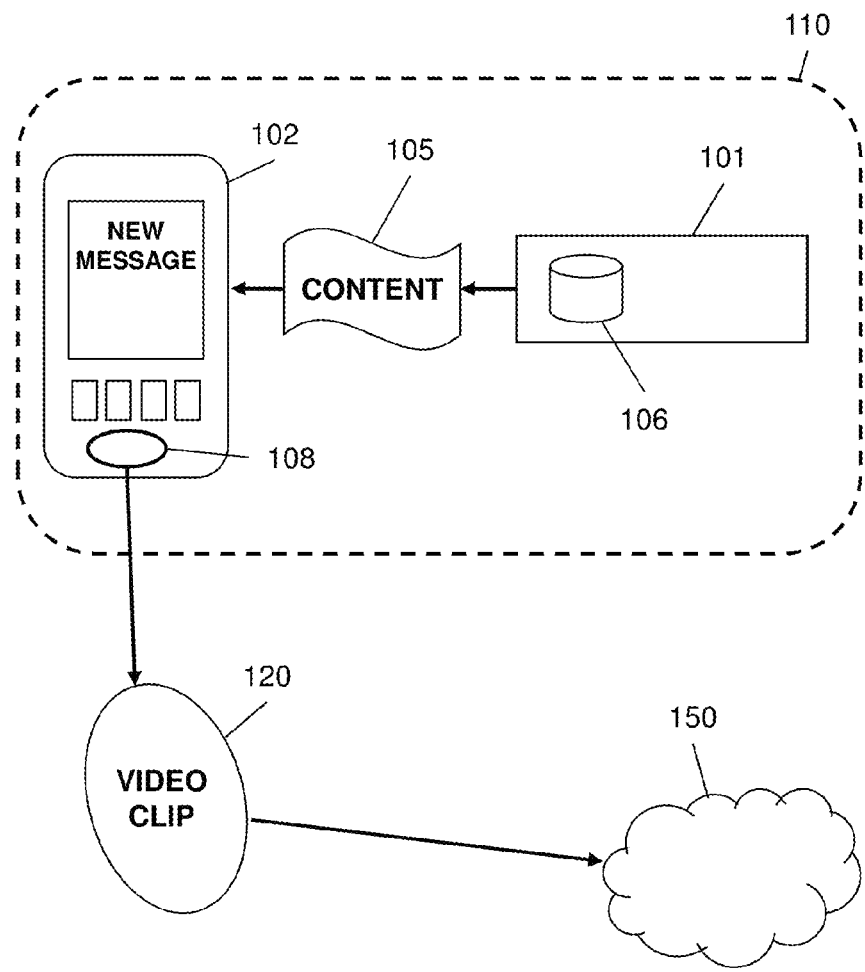
FIG. 1 schematically illustrates a system for using a messaging client of a mobile phone to share a video clip representing content viewed on a television, in accordance with embodiments of the disclosure.

The subject disclosure describes, among other things, illustrative embodiments for facilitating sharing, by a mobile phone user, content that the user has viewed on a television coupled to a media processor. The media processor and the mobile phone form a natively integrated device, so that a video clip of the content can be produced and transmitted without installation of an application on the mobile phone. Other embodiments are described in the subject disclosure.

One or more aspects of the subject disclosure include a method comprising receiving, by a processing system including a processor of a mobile phone, a first signal indicating that sharing of a portion of video content is to be performed; the video content is presented at a display device coupled to a media processor and the media processor is separate from the mobile phone. The method also comprises receiving a second signal initiating a message via a messaging client of the mobile phone; obtaining the portion of video content from a first cache accessible to the media processor; presenting the portion of video content at the mobile phone; and receiving a third signal representing at least one of a start time and a stop time defining an endpoint of a video clip from the portion of video content. The method further comprises attaching to the video clip additional video content provided at the mobile phone, thereby producing an extended video clip. The method further comprises converting a format of the extended video clip, thereby producing a converted video clip and enabling presentation of the converted video clip at a recipient device. The method also comprises transmitting the converted video clip to the recipient device via the messaging client. The media processor and the mobile phone comprise a natively integrated device; accordingly, the converted video clip is acquired, produced and transmitted without installation of an application on the mobile phone being required.

One or more aspects of the subject disclosure include a device comprising a processing system including a processor, and a memory that stores executable instructions that, when executed by the processing system, facilitate performance of operations. The operations comprise receiving a first signal at a processor of a mobile phone indicating that sharing of a portion of video content is to be performed; the video content is presented at a display device coupled to a media processor separate from the mobile phone. The operations also comprise receiving a second signal initiating a message via a messaging client of the mobile phone; obtaining the portion of video content from a first cache accessible to the media processor; presenting the portion of video content at the mobile phone; and receiving a third signal representing at least one of a start time and a stop time defining an endpoint of a video clip from the portion of video content. The operations further comprise editing the video clip in accordance with user input at the mobile phone; attaching to the video clip additional video content provided at the mobile phone to produce an extended video clip; and converting a format of the extended video clip, thereby producing a converted video clip and enabling presentation of the converted video clip at a recipient device. The operations also comprise transmitting the converted video clip to the recipient device via the messaging client. The media processor and the mobile phone comprise a natively integrated device; accordingly, the converted video clip is acquired, produced and transmitted without installation of an application on the mobile phone being required, and the media processor and the mobile phone are mutually authenticated.

One or more aspects of the subject disclosure include a machine-readable storage medium comprising executable instructions that, when executed by a processing system including a processor, facilitate performance of operations. The operations comprise receiving a first signal at a processor of a mobile phone; the first signal indicates that sharing of a portion of video content is to be performed, and the video content comprises content presented at a display device and viewed by a user of the mobile phone; the display device is coupled to a media processor separate from the mobile phone. The operations also comprise receiving a second signal initiating a message via a messaging client of the mobile phone; obtaining the portion of video content from a first cache accessible to the media processor; presenting the portion of video content at the mobile phone; receiving a third signal representing at least one of a start time and a stop time defining an endpoint of a video clip from the portion of video content; and attaching to the video clip additional video content provided at the mobile phone, thereby producing an extended video clip. The operations further comprise converting a format of the extended video clip, thereby producing a converted video clip and enabling presentation of the converted video clip at a recipient device. The operations also comprise transmitting the converted video clip to the recipient device via the messaging client; the user is a first subscriber to a content provider system in communication with the media processor, and the recipient device is a mobile device of a second subscriber to the content provider system. The media processor and the mobile phone comprise a natively integrated device; accordingly, the converted video clip is acquired, produced and transmitted without installation of an application on the mobile phone being required.

FIG. 1 schematically illustrates a system 100 in which a mobile phone 102 (e.g. a smartphone) can obtain video content 105 from a media processor 101 (e.g. a set top box or STB); the media processor also delivers the video content for viewing at a television display (not shown) coupled to the media processor. In this embodiment, the native functions of the mobile phone 102 are integrated with the media processor 101, so that the mobile phone 102 and media processor 101 form a natively integrated device 110. It will be appreciated that since the native functions of the media processor and mobile phone are integrated, installation of an application on the mobile phone is not required for the mobile phone to obtain the video content from the STB. In addition, the video content 105 does not need to be presented for viewing at the mobile phone; in this embodiment, a user of the mobile phone can view the video content at the television display, but might or might not view the content within a mobile application.

In an embodiment, the STB 101 obtains content from a remote content provider, and keeps a cache 106 of recently viewed content (for example, the last 10 minutes of content delivered to the television display). In this embodiment, the mobile phone 102 obtains the video content 105 from the cache 106. In a further embodiment, the STB can make the cached content available to another authorized client device.

The video content 105 (or a portion thereof) can be shared with other devices via the network 150, using a messaging feature of the smartphone. In this embodiment, a new message can be initiated using the native messaging feature 108 of the smartphone. The video content 105 obtained from the cache 106 can then be edited at the mobile phone to produce a video clip 120 suitable for transmission to other devices via the network 150. The video clip 120 may or may not include all of the content 105, and may include additional content entered via the mobile phone. It will be appreciated that the sharing of the content (in this embodiment, transmission of the video clip 120 via messaging) and the consumption of the content (that is, viewing at the television display) can occur at separate locations. Furthermore, it will be appreciated that sharing can be performed without installing a smartphone application for viewing the content.

Figure 2:
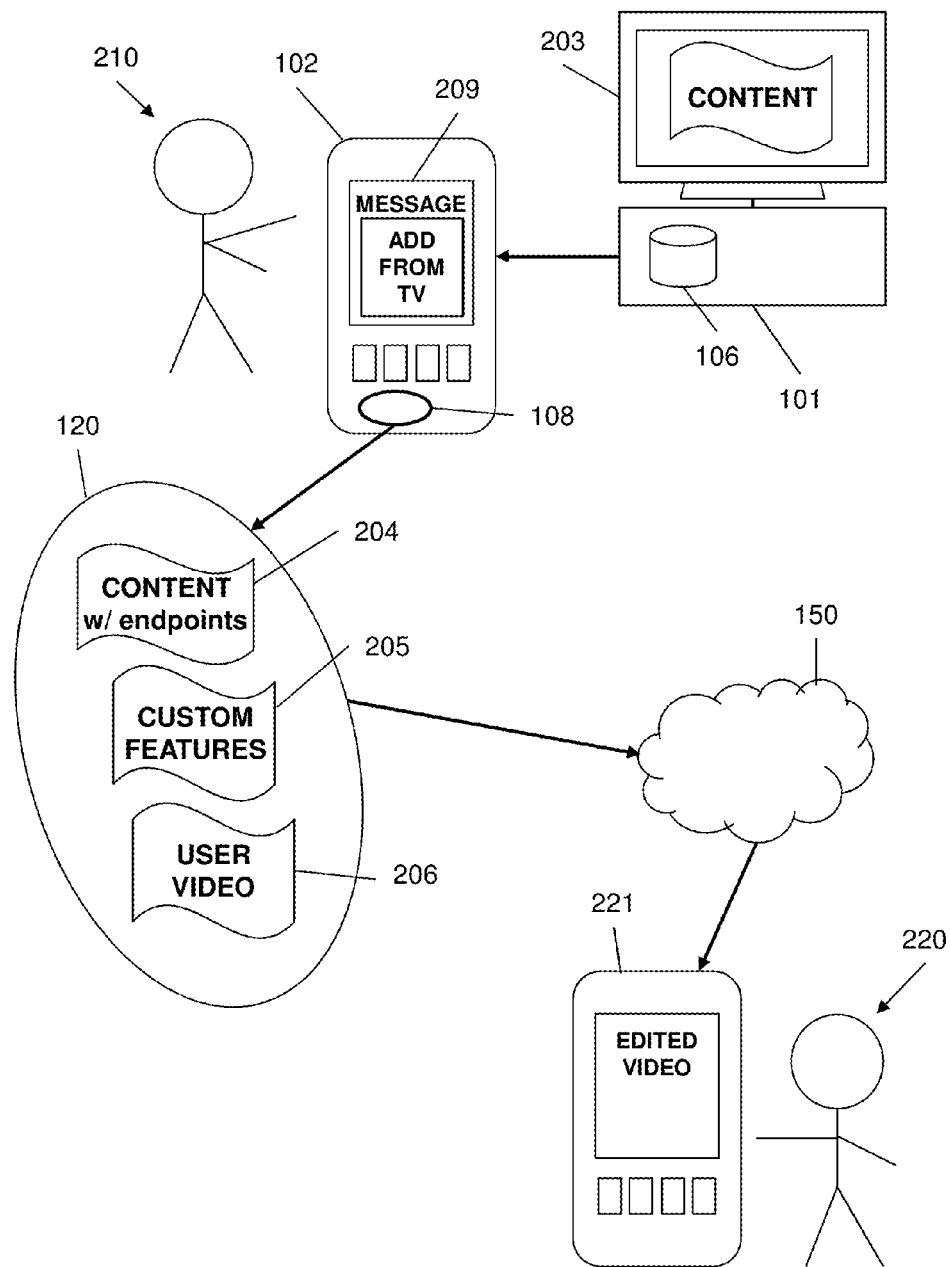
FIG. 2 schematically illustrates a procedure in which the system of FIG. 1 is used to transmit a customized video clip to a recipient device, in accordance with embodiments of the disclosure.

FIG. 2 schematically illustrates a system 200 in which a user 210 of smartphone 102 is watching a program on television 203 coupled to STB 101, and sees something interesting to share with another user 220. In this embodiment, the STB receives the program content from a content provider system to which the user 210 is a subscriber, and the STB 101 and the smartphone 102 are associated with the same subscriber account. The STB and the smartphone thus can have a native account level authentication (and accordingly be natively mutually authenticated).

In this embodiment, the STB stores recently viewed content (for example, the most recent 10 minutes that were viewed) in cache 106 at the STB. Alternatively, the content provider service can maintain a cache (e.g. in cloud storage) that is programmatically available to an authorized client.

To share the desired content, the user 210 opens the messaging client 108 of the smartphone and initiates a new message 209. In this embodiment, the messaging client presents the user with an option to send an attachment with the message. The user can then select the attachment option, thereby invoking an attachment menu that can include an option "Add From TV."

To produce a video clip for transmission to the smartphone 221 of user 220, the user 210 selects "Add from TV" and is then presented with the cached content (in this embodiment, 10 minutes' most recently viewed content) along with editing controls. The editing controls can be activated in response to the user's selection of the "Add from TV" option.

In this embodiment, the user 210 can select a start point and/or an end point for the video clip. The duration of the clip will typically be limited based on rights agreements. In an embodiment, rights management is performed by a remotely located function of the content provider system; if the user chooses one endpoint for the clip, the system will provide the other end point so that the clip has an appropriate duration.

The user can customize the clip by setting color filters, setting a presentation speed, adding text labels and stickers, etc. Customizing features can be invoked by the user via a user interface at the smartphone and added by the remote system; alternatively, various editing functions can be native to the smartphone.

In an embodiment, the user can add a self-recorded video to the beginning and/or end of the clip. The user video can be created either before or after the content is obtained, and stored at the smartphone. In another embodiment, the smartphone can store previously obtained and customized content, which is then added to the clip.

In this embodiment, the video clip 120 includes the video content 204 (with selected or prescribed endpoints) having custom features 205, and a user-supplied video 206 attached to the customized content. The clip 120 is then converted to a format (for example, animated graphics interchange format) suitable for sending, via the native messaging service of the smartphone 102, to recipient device 221. The recipient device 221 can thus present the clip 120 without the need to have any special applications installed.

Figure 3:
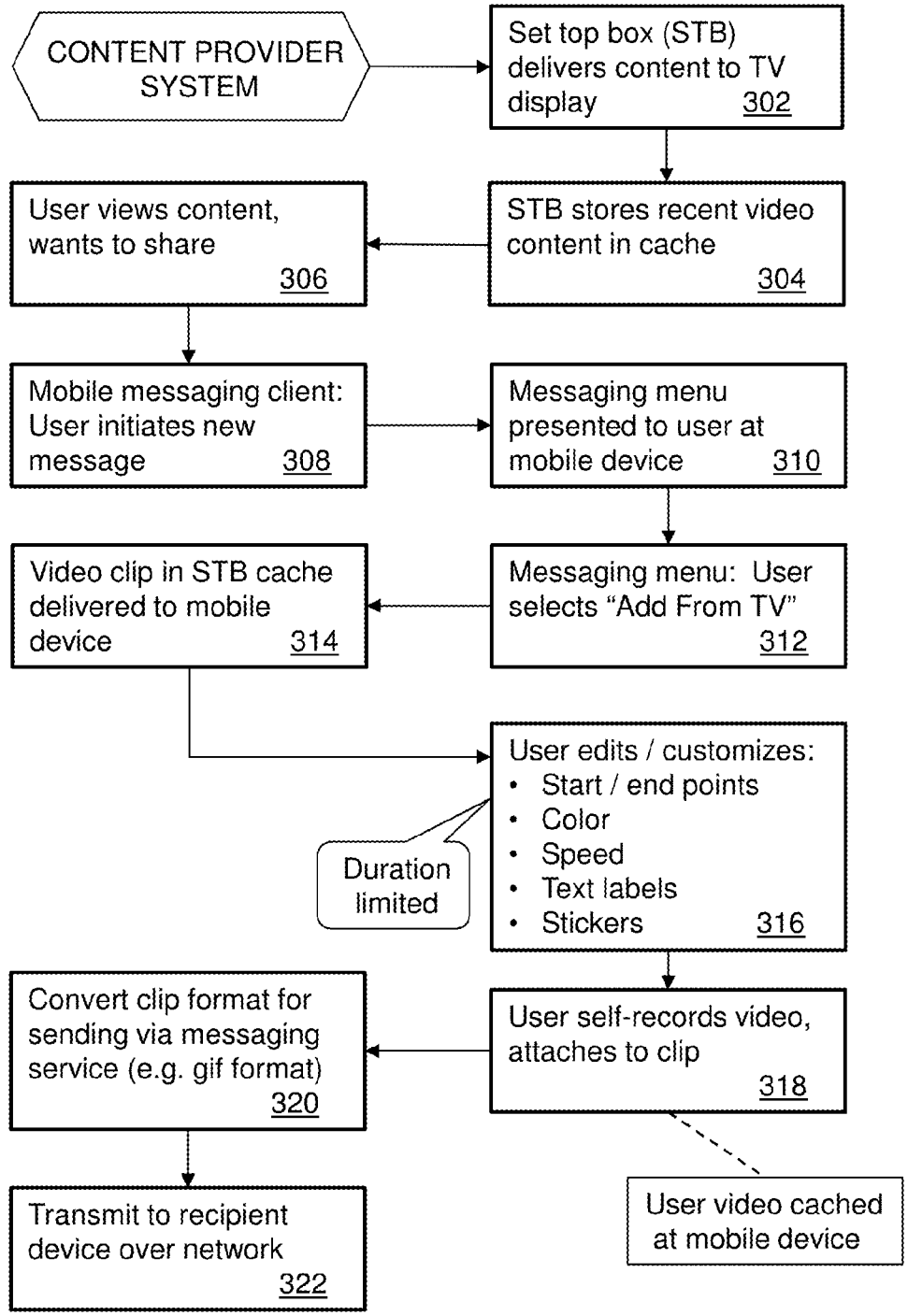
FIG. 3 is a flowchart illustrating a procedure for sharing video content through a mobile phone, in accordance with embodiments of the disclosure.

FIG. 3 depicts an illustrative embodiment of a method 300 for sharing video content from a set top box through a mobile phone, using system 100. In step 302, the STB receives content from the content provider system and delivers that content for display at the TV. In step 304, the STB also stores the recently delivered content in a cache (either local or remote).

The user views the content and decides to share it (step 306). The user invokes the messaging client on his mobile device and initiates a new message (step 308). In this embodiment, the user is presented with a messaging menu at the mobile device (step 310) where one of the menu choices is "Add from TV." The user selects "Add from TV" (step 312) which results in the video clip being delivered to the mobile device (step 314). The user then edits and customizes the content (step 316) and adds self-recorded content (and/or other content cached at the mobile device) to the clip (step 318).

The edited and customized clip is converted (step 320) to a format for sending via the messaging service of the mobile device, and then transmitted to a recipient device (step 322), typically over a network.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
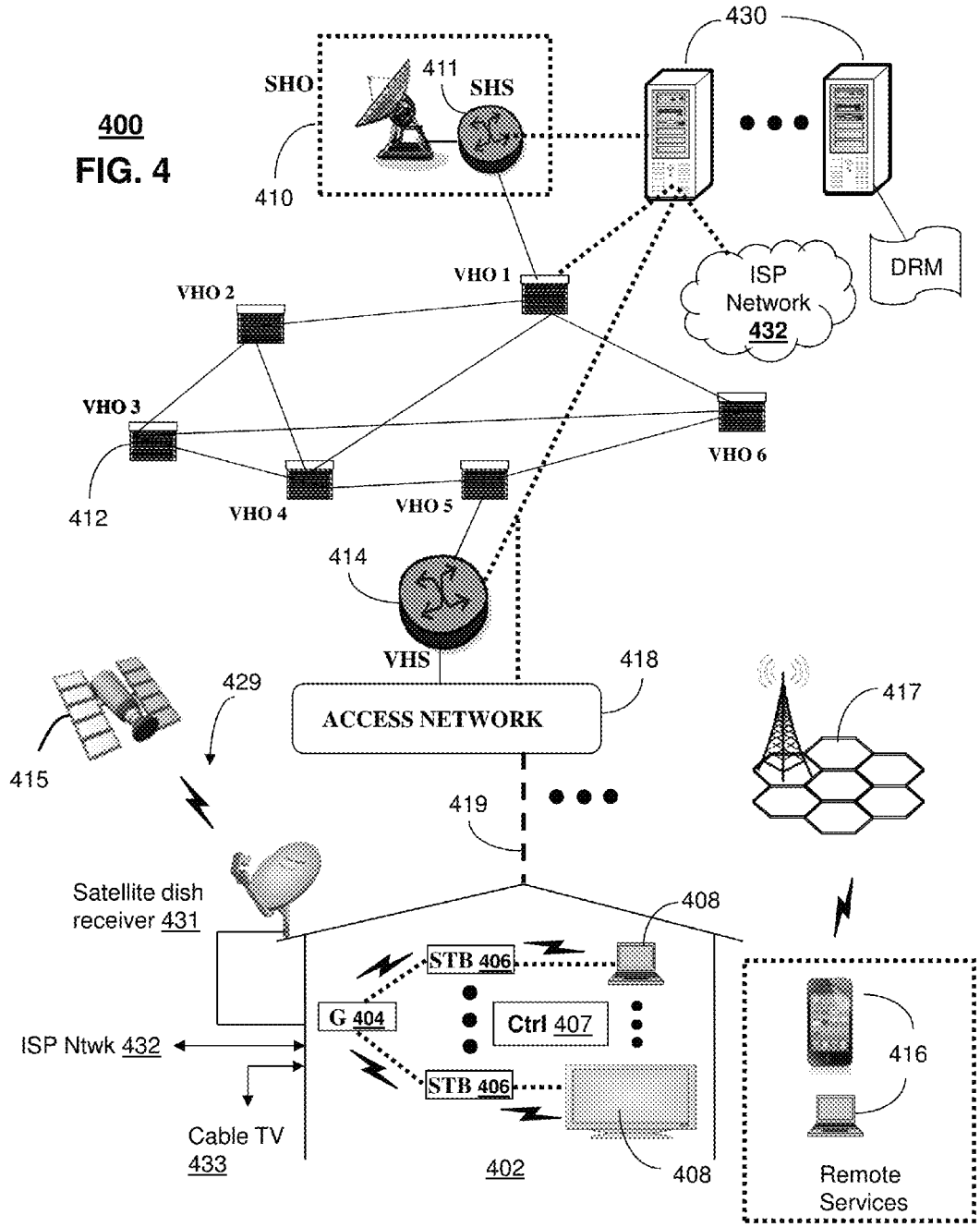
FIGS. 4-6 depict illustrative embodiments of communication systems that provide media services used in performing the procedures of FIGS. 2 and 3.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with the arrangements of FIGS. 1 and/or 2 as another representative embodiment of communication system 400. For instance, one or more devices illustrated in the communication system 400 of FIG. 4 can perform operations comprising receiving a first signal at a processor of a mobile phone indicating that sharing of a portion of video content is to be performed, where the video content is presented at a display device coupled to a media processor separate from the mobile phone. The operations can also comprise receiving a second signal initiating a message via a messaging client of the mobile phone; obtaining the portion of video content from a first cache accessible to the media processor; presenting the portion of video content at the mobile phone; and receiving a third signal representing at least one of a start time and a stop time defining an endpoint of a video clip from the portion of video content. The operations can further comprise editing the video clip in accordance with user input at the mobile phone; attaching to the video clip additional video content provided at the mobile phone to produce an extended video clip; and converting a format of the extended video clip, thereby producing a converted video clip and enabling presentation of the converted video clip at a recipient device. The operations can also comprise transmitting the converted video clip to the recipient device via the messaging client. The media processor and the mobile phone comprise a natively integrated device; accordingly, the converted video clip can be acquired, produced and transmitted without installation of an application on the mobile phone being required, and the media processor and the mobile phone can be mutually authenticated.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller). Unicast communications can also be invoked between the media processors 406 and subsystems of the IPTV media system for services such as video-on-demand (VoD), browsing an electronic programming guide (EPG), or other infrastructure services.

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. In particular, in the embodiments discussed above with reference to FIGS. 1-2, the STB 101 and mobile phone 102, can communicate over an Internet-accessible WiFi network. Alternatively, the STB and mobile phone can communicate using LTE technology, a direct WiFi connection, a Bluetooth connection, etc.

A satellite broadcast television system 429 can be used in the media system of FIG. 4 to deliver content to a media processor (for example, STB 101 in FIG. 1 or media processor 406 in FIG. 4). The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above. Alternatively, content can be distributed via a streaming service (using, for example, cloud computing).

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

In communication system 400, all or a portion of the computing devices 430 can function as video content provider servers (herein referred to as server 430). The server 430 can use computing and communication technology to perform video content management functions, which can include among other things, digital rights management (DRM). The media processors 406 and wireless communication devices 416 can be provisioned with software functions respectively, to utilize the services of server 430. For instance, functions of media processors 406 and wireless communication devices 416 can be similar to the functions described for STB 101 and mobile devices 102, 221 of FIGS. 1-2 in accordance with method 300 of FIG. 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

The server 430 of FIG. 4 can be operably coupled to communication system 500 for purposes similar to those described above. Server 430 can provide communications services to the communication devices of FIGS. 1-2, which can be adapted with software to utilize the services of the server 430. Server 430 can also be an integral part of the content provider system discussed above with regard to the method 300.

It will be appreciated that natively integrated devices according to various embodiments of the disclosure, examples of which are described herein, can be used in mobile communications including, but not limited to, fourth generation long term evolution (4G LTE) communications described in whole or in part by standards bodies such as Third Generation Partnership Project (3GPP). Embodiments of the disclosure may also be applicable to technologies evolving from 4G LTE, such as LTE Advanced (3GPP Release 10), LTE Advanced Pro (3GPP Release 13), and fifth generation radio access networks (5G RAN).

Figure 5:
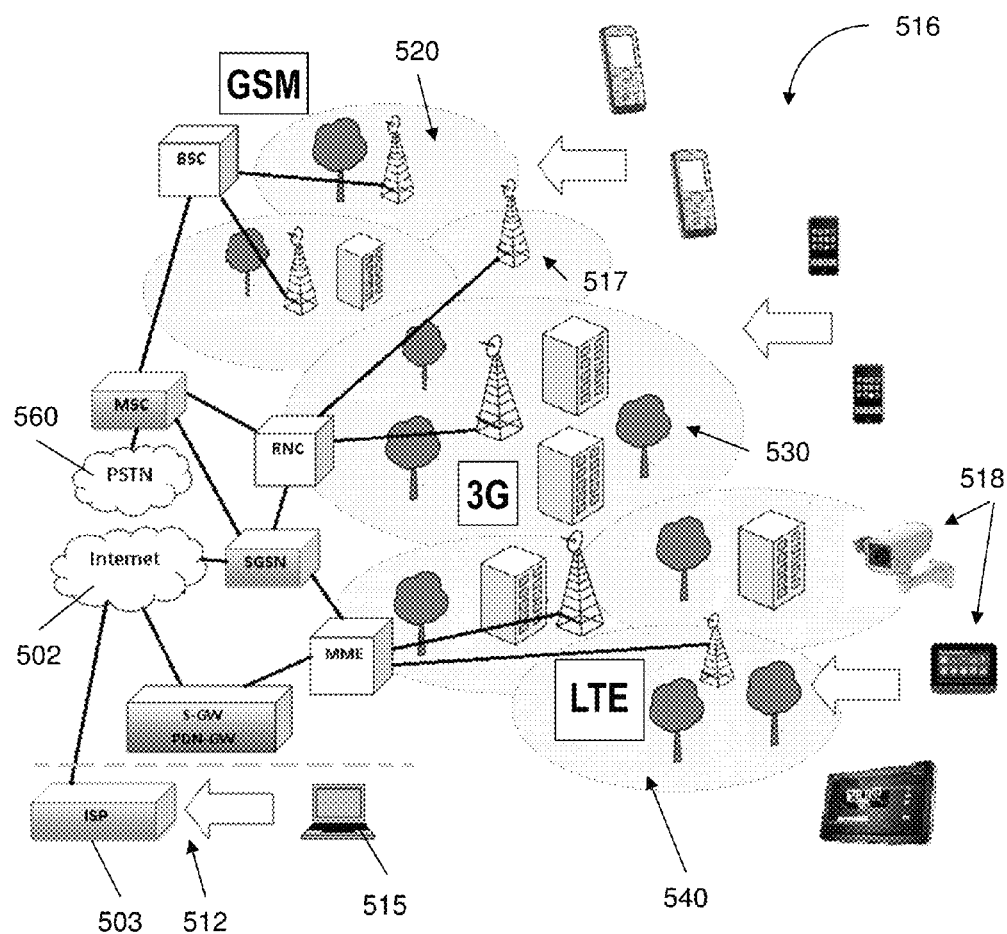

FIG. 5 depicts an illustrative embodiment of an architecture 500 for a network for interacting with mobile communication devices. According to an embodiment of the disclosure, a mobile device 516 (which may correspond to a UE 110) can connect with one or more of the networks shown in FIG. 5 using a personal credential and a mobile device gateway. Mobile devices 516 may represent a variety of technologies (phones, tablets, etc.) and may have an end-to-end connection established with either the Public Switched Telephone Network (PSTN) 660, in the case of voice traffic, or an internet protocol network (Internet) 502, in the case of data traffic. The architecture can include a Global System for Mobile (GSM) network 520, a 3G network 530, and/or a Long Term Evolution (LTE) network 640. In particular, LTE specifications define an all-internet protocol architecture with voice over internet protocol (VoIP).

FIG. 5 also illustrates a device 515 accessing the network through a broadband connection 512 to an Internet Service Provider (ISP) 503. Any of devices 515-516 can include a processing system including a processor and a memory that stores executable instructions that, when executed by the processing system, facilitate performance of operations. The operations can comprise receiving a first signal at a processor of a mobile phone, where the first signal indicates that sharing of a portion of video content is to be performed. The video content can comprise content presented at a display device and viewed by a user of the mobile phone, where the display device is coupled to a media processor separate from the mobile phone. The operations can also comprise receiving a second signal initiating a message via a messaging client of the mobile phone; obtaining the portion of video content from a first cache accessible to the media processor; presenting the portion of video content at the mobile phone; and receiving a third signal representing at least one of a start time and a stop time defining an endpoint of a video clip from the portion of video content. The operations can also comprise attaching to the video clip additional video content provided at the mobile phone, thereby producing an extended video clip; converting a format of the extended video clip, thereby producing a converted video clip and enabling presentation of the converted video clip at a recipient device; and transmitting the converted video clip to the recipient device via the messaging client. The first user can be a first subscriber to a content provider system in communication with the media processor, and the recipient device can be a mobile device of a second subscriber to the content provider system. The media processor and the mobile phone comprise a natively integrated device; accordingly, the converted video clip is produced and transmitted without installation of an application on the mobile phone being required.

Figure 6:
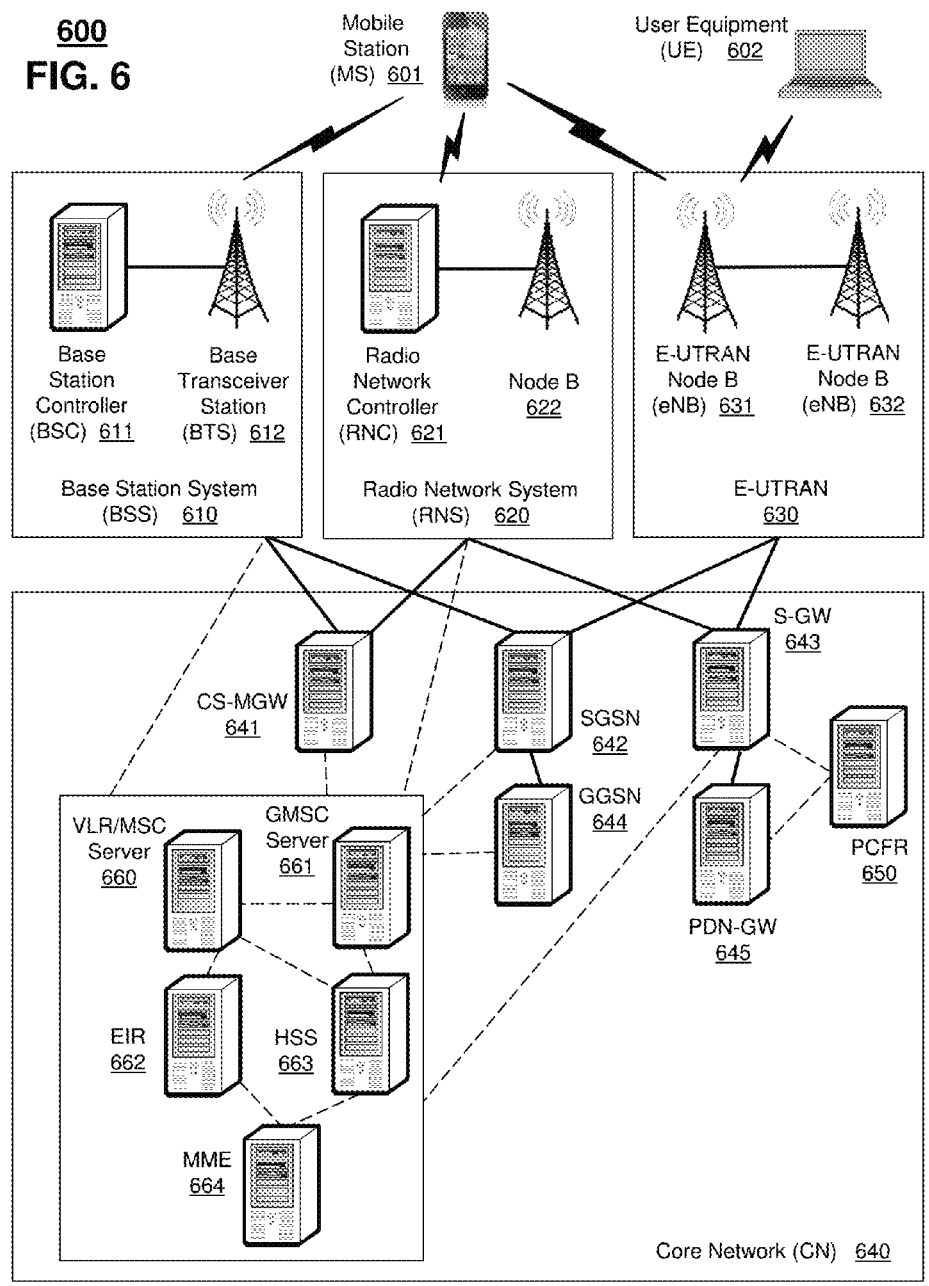

FIG. 6 schematically illustrates a communication system 600 in which one or more embodiments of the subject disclosure may be implemented. Mobile Station 601 may be one of, but not limited to, a cellular telephone, a cellular telephone in combination with another electronic device or any other wireless mobile communication device. According to an embodiment of the disclosure, Mobile Station 601 and/or User Equipment 602 can communicate wirelessly with one or more of the systems shown in FIG. 6.

Mobile Station 601 may communicate wirelessly with Base Station System (BSS) 610. BSS 610 contains a Base Station Controller (BSC) 611 and a Base Transceiver Station (BTS) 612. BSS 610 may include a single BSC 611/BTS 612 pair (Base Station) or a system of BSC/BTS pairs which are part of a larger network. BSS 610 is responsible for communicating with Mobile Station 601 and may support one or more cells. BSS 610 is responsible for handling cellular traffic and signaling between Mobile Station 601 and Core Network 640. BSS 610 can perform functions that include, but are not limited to, digital conversion of speech channels, allocation of channels to mobile devices, paging, and transmission/reception of cellular signals.

Additionally, Mobile Station 601 may communicate wirelessly with Radio Network System (RNS) 620. RNS 620 contains a Radio Network Controller (RNC) 621 and one or more Node(s) B 622. RNS 620 may support one or more cells. RNS 620 may also include one or more RNC 621/Node B 622 pairs or alternatively a single RNC 621 may manage multiple Nodes B 622. RNS 620 is responsible for communicating with Mobile Station 601 in its geographically defined area. RNC 621 is responsible for controlling the Node(s) B 622 that are connected to it and is a control element in a UMTS radio access network. RNC 621 can perform functions such as, but not limited to, load control, packet scheduling, handover control, security functions, as well as controlling access by Mobile Station 601 access to the Core Network (CN).

The evolved UMTS Terrestrial Radio Access Network (E-UTRAN) 630 is a radio access network that provides wireless data communications for Mobile Station 601 and User Equipment 602. E-UTRAN 630 provides higher data rates than traditional UMTS. It is part of the Long Term Evolution (LTE) upgrade for mobile networks; later releases meet the requirements of the International Mobile Telecommunications (IMT) Advanced and are commonly known as a 4G networks. E-UTRAN 630 may include a series of logical network components such as E-UTRAN Node B (eNB) 631 and E-UTRAN Node B (eNB) 632. E-UTRAN 630 may contain one or more eNBs. User Equipment 602 may be any user device capable of connecting to E-UTRAN 630 including, but not limited to, a personal computer, laptop, mobile device, wireless router, or other device capable of wireless connectivity to E-UTRAN 630. The improved performance of the E-UTRAN 630 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 6 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Mobile Station 601 may communicate with any or all of BSS 610, RNS 620, or E-UTRAN 630. In an illustrative system, each of BSS 610, RNS 620, and E-UTRAN 630 may provide Mobile Station 601 with access to Core Network 640. The Core Network 640 may include of a series of devices that route data and communications between end users. Core Network 640 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 641 is part of Core Network 640, and interacts with Visitor Location Register (VLR) and Mobile-Services Switching Center (MSC) Server 660 and Gateway MSC Server 661 in order to facilitate Core Network 640 resource control in the CS domain. Functions of CS-MGW 641 include, but are not limited to, media conversion, bearer control, payload processing and other mobile network processing such as handover or anchoring. CS-MGW 641 may receive connections to Mobile Station 601 through BSS 610, RNS 620 or both.

Serving GPRS Support Node (SGSN) 642 stores subscriber data regarding Mobile Station 601 in order to facilitate network functionality. SGSN 642 may store subscription information such as, but not limited to, the International Mobile Subscriber Identity (IMSI), temporary identities, or Packet Data Protocol (PDP) addresses. SGSN 642 may also store location information such as, but not limited to, the Gateway GPRS Support Node (GGSN) 644 address for each GGSN where an active PDP exists. GGSN 644 may implement a location register function to store subscriber data it receives from SGSN 642 such as subscription or location information.

Serving Gateway (S-GW) 643 is an interface which provides connectivity between E-UTRAN 630 and Core Network 640. Functions of S-GW 643 include, but are not limited to, packet routing, packet forwarding, transport level packet processing, event reporting to Policy and Charging Rules Function (PCRF) 650, and mobility anchoring for inter-network mobility. PCRF 650 uses information gathered from S-GW 643, as well as other sources, to make applicable policy and charging decisions related to data flows, network resources and other network administration functions. Packet Data Network Gateway (PDN-GW) 645 may provide user-to-services connectivity functionality including, but not limited to, network-wide mobility anchoring, bearer session anchoring and control, and IP address allocation for PS domain connections.

Home Subscriber Server (HSS) 663 is a database for user information; HSS 663 can store subscription data regarding Mobile Station 601 or User Equipment 602 for handling calls or data sessions. Networks may contain one HSS 663, or more if additional resources are required. Exemplary data stored by HSS 663 include, but is not limited to, user identification, numbering and addressing information, security information, or location information. HSS 663 may also provide call or session establishment procedures in both the PS and CS domains.

The VLR/MSC Server 660 can provide user location functionality. In an embodiment, when Mobile Station 601 enters a new network location, it begins a registration procedure. A MSC Server for that location transfers the location information to the VLR for the area. A VLR and MSC Server may be located in the same computing environment, as is shown by VLR/MSC Server 660, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 601 registration or procedures for handover of Mobile Station 601 to a different section of the Core Network 640. GMSC Server 661 may serve as a connection to alternate GMSC Servers for other mobile stations in larger networks.

Equipment Identity Register (EIR) 662 is a logical element which may store the International Mobile Equipment Identities (IMEI) for Mobile Station 601. In a typical embodiment, user equipment may be classified as either "white listed" or "black listed" depending on its status in the network. In one embodiment, if Mobile Station 601 is stolen and put to use by an unauthorized user, it may be registered as "black listed" in EIR 662, preventing its use on the network. Mobility Management Entity (MME) 664 is a control node which may track Mobile Station 601 or User Equipment 602 if the devices are idle. Additional functionality may include the ability of MME 664 to contact an idle Mobile Station 601 or User Equipment 602 if retransmission of a previous session is required.

Figure 7:
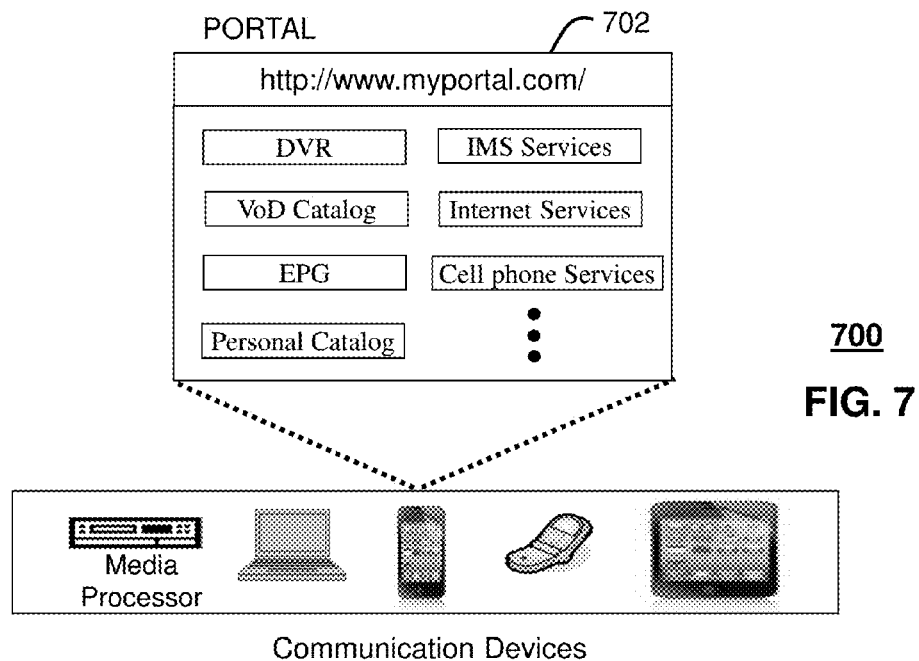
FIG. 7 depicts an illustrative embodiment of a web portal for interacting with the communication systems of FIGS. 4-6.

FIG. 7 depicts an illustrative embodiment of a web portal 702 of a communication system 700. Communication system 700 can be overlaid or operably coupled with systems 100 and 200 of FIGS. 1 and/or 2, as another representative embodiment of communication systems 400-600. The web portal 702 can be used for managing services of systems 100 and 200 of FIGS. 1 and/or 2, and communication systems 400-600. A web page of the web portal 702 can be accessed by a Uniform Resource Locator (URL) with an Internet browser using an Internet-capable communication device such as those described in FIGS. 1 and/or 2 and FIGS. 4-5. The web portal 702 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 702 can also be used for provisioning Internet services, provisioning cellular phone services, and so on.

The web portal 702 can further be utilized to manage and provision software applications to adapt these applications as may be desired by subscribers and/or service providers of systems 100-200 of FIGS. 1 and/or 2, and communication systems 400-600. Such applications can be used to extend the native sharing functions of the STB and mobile device described above. For instance, subscribers can log into their on-line accounts and provision the server 430 with contact information to enable communication with devices described in FIGS. 1, 2 and 4. Service providers can log onto an administrator account to provision, monitor and/or maintain the systems 100-200 of FIGS. 1 and/or 2 or server 430.

Figure 8:
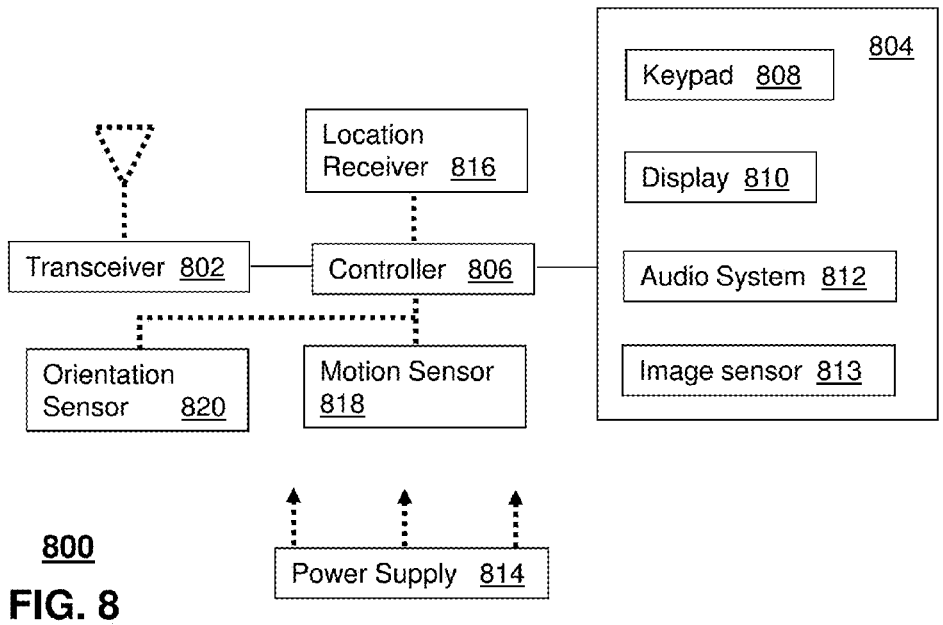
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1-2 and FIGS. 4-6, and can be configured to perform portions of method 300 of FIG. 3.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800.

In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of devices of FIGS. 1 and/or 2, the media processor 406, the media devices 408, or the portable communication devices 416, 516, 601 of FIGS. 4-6. It will be appreciated that the communication device 800 can also represent other devices that can operate in systems of FIGS. 1 and/or 2, and in communication system 400 such as a gaming console and a media player.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
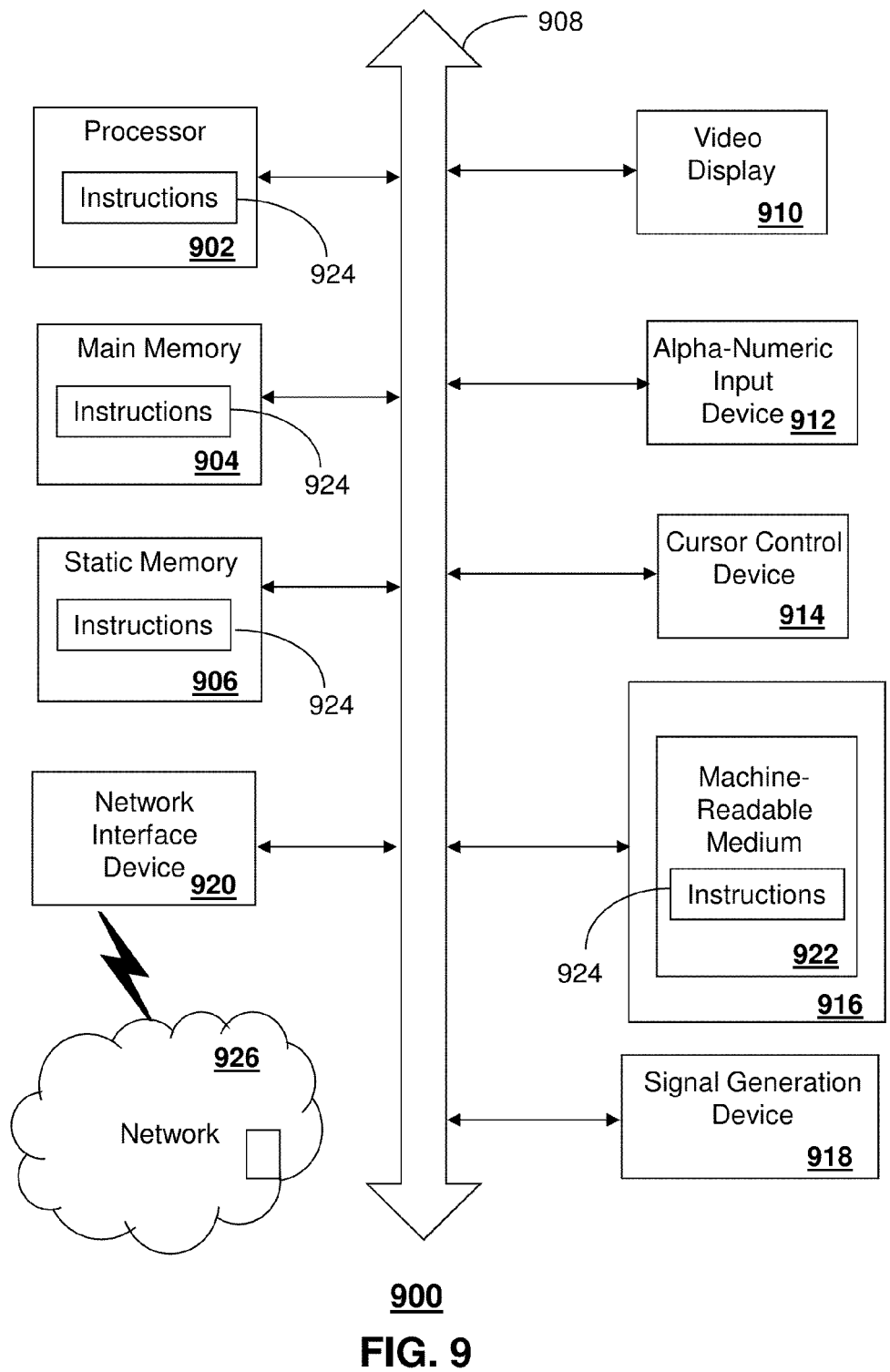
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the server 430, the media processor 406, the STB 101, the mobile device 102 and other devices of FIGS. 1-2 and 4-6. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, by a processing system including a processor of a mobile phone, a first signal during presentation of video content at a display device coupled to a media processor, the first signal indicating that sharing of a portion of video content is to be performed, the media processor being separate from the mobile phone;
receiving, by the processing system, a second signal initiating a message via a messaging client of the mobile phone;
obtaining, by the processing system, the portion of video content from a cache of the media processor, wherein the cache stores video content presented within a predetermined time period ending at a present time;
presenting, by the processing system, the portion of video content at the mobile phone;
receiving, by the processing system, a third signal representing at least one of a start time and a stop time defining an endpoint of a video clip from the portion of video content;
attaching, by the processing system, to the video clip additional video content captured at the mobile phone, thereby producing an extended video clip;
converting, by the processing system, a format of the extended video clip, thereby producing a converted video clip and enabling presentation of the converted video clip at a recipient device;
transmitting, by the processing system, the converted video clip to the recipient device via the messaging client,
wherein the media processor and the mobile phone comprise a natively integrated device, the converted video clip accordingly being produced and transmitted without installation of an application on the mobile phone being required.

2. The method of claim 1, wherein the converted video clip has an animated graphics interchange format (GIF).

3. The method of claim 2, further comprising editing, by the processing system, the video clip in accordance with user input at the mobile phone, wherein the user input comprises a color setting, a text label, a sticker, or a combination thereof.

4. The method of claim 1, further comprising adjusting, by the processing system, a duration of the video clip in accordance with a rights agreement relating to the portion of video content.

5. The method of claim 1, wherein the video content comprises television content viewed by a user of the mobile phone.

6. The method of claim 5, wherein the user is a first subscriber to a content provider system, and wherein the recipient device is a mobile device of a second subscriber to the content provider system.

7. The method of claim 1, wherein the additional content comprises video images captured at the mobile phone using a recording feature of the mobile phone.

8. The method of claim 1, wherein the additional content comprises video images previously obtained by the processing system and stored in a second cache accessible to a processor of the mobile phone.

9. The method of claim 1, wherein in accordance with the media processor and the mobile phone comprising the natively integrated device, the media processor and the mobile phone are mutually authenticated.

10. The method of claim 1, wherein the first cache comprises a local cache of a set top box.

11. A device comprising:
a processing system including a processor of a mobile phone; and
a memory that stores executable instructions that, when executed by the processing system, facilitate performance of operations comprising:
receiving a first signal during presentation of video content at a display device coupled to a media processor, the first signal indicating that sharing of a portion of video content is to be performed, the media processor being separate from the mobile phone;
receiving a second signal initiating a message via a messaging client of the mobile phone;
obtaining the portion of video content from a first cache accessible to the media processor, wherein the cache stores video content presented within a predetermined time period ending at a present time;
presenting the portion of video content at the mobile phone;
receiving a third signal representing at least one of a start time and a stop time defining an endpoint of a video clip from the portion of video content;
editing the video clip in accordance with user input at the mobile phone;
attaching to the video clip additional video content provided at the mobile phone, thereby producing an extended video clip;
converting a format of the extended video clip, thereby producing a converted video clip and enabling presentation of the converted video clip at a recipient device; and
transmitting the converted video clip to the recipient device via the messaging client,
wherein the media processor and the mobile phone comprise a natively integrated device, the converted video clip accordingly being produced and transmitted without installation of an application on the mobile phone being required, and wherein the media processor and the mobile phone are mutually authenticated.

12. The device of claim 11, wherein the converted video clip has an animated graphics interchange format (GIF).

13. The device of claim 11, wherein the operations further comprise adjusting a duration of the video clip in accordance with a rights agreement relating to the portion of video content.

14. The device of claim 11, wherein the video content comprises television content viewed by a user of the mobile phone.

15. The device of claim 11, wherein the additional content comprises video images captured at the mobile phone using a recording feature of the mobile phone.

16. A machine-readable storage medium comprising executable instructions that, when executed by a processing system including a processor of a mobile phone, facilitate performance of operations comprising:
   receiving a first signal during presentation of video content at a display device coupled to a media processor, the first signal indicating that sharing of a portion of video content is to be performed, the media processor being separate from the mobile phone;
   receiving a second signal initiating a message via a messaging client of the mobile phone;
   obtaining the portion of video content from a first cache accessible to the media processor, wherein the first cache stores video content presented within a predetermined time period ending at a present time;
   presenting the portion of video content at the mobile phone;
   receiving a third signal representing at least one of a start time and a stop time defining an endpoint of a video clip from the portion of video content;
   attaching to the video clip additional video content provided at the mobile phone, thereby producing an extended video clip;
   converting a format of the extended video clip, thereby producing a converted video clip and enabling presentation of the converted video clip at a recipient device; and
   transmitting the converted video clip to the recipient device via the messaging client,
   wherein a user of the mobile phone is a first subscriber to a content provider system in communication with the media processor, and wherein the recipient device is a mobile device of a second subscriber to the content provider system,
   wherein the media processor and the mobile phone comprise a natively integrated device, the converted video clip accordingly being produced and transmitted without installation of an application on the mobile phone being required.

17. The machine-readable storage medium of claim 16, wherein the converted video clip has an animated graphics interchange format (GIF).

18. The machine-readable storage medium of claim 16, wherein the operations further comprise editing the video clip in accordance with user input at the mobile phone, wherein the user input comprises a color setting, a text label, a sticker, or a combination thereof.

19. The machine-readable storage medium of claim 16, wherein the additional content comprises video images captured at the mobile phone using a recording feature of the mobile phone.

20. The machine-readable storage medium of claim 16, wherein the additional content comprises video images previously obtained by the mobile phone and stored in a second cache accessible to the processor of the mobile phone.

* * * * *